April 10, 1928.

N. S. HILLYARD 1,665,925

LIQUID DISPENSING DEVICE

Filed Jan. 21, 1927

INVENTOR
*Newton S. Hillyard.*
BY
*Arthur Le Brown*
ATTORNEY

Patented Apr. 10, 1928.

1,665,925

UNITED STATES PATENT OFFICE.

NEWTON S. HILLYARD, OF ST. JOSEPH, MISSOURI.

LIQUID-DISPENSING DEVICE.

Application filed January 21, 1927. Serial No. 162,499.

My invention relates to liquid dispensing devices and more particularly to floating gages designed to indicate the level of liquid in the reservoir of such a device.

My object is to provide an indicating gage having a minimum number of parts and operating with certainty, and being so constructed and disposed that its legend is visible on particular parts of a reservoir where such visibility is desirable.

I accomplish this object by producing a floating gage having an arm pivoted in the reservoir wall and protruding therethrough and carrying an index rotatable on a particular portion of the wall prepared therefor, the stem of the gage being bent in a special manner for accommodation to its situation. These and other structural features and the end accomplished by reason thereof, will be described in detail with references to the accompanying drawings, in which.

Figure 1:
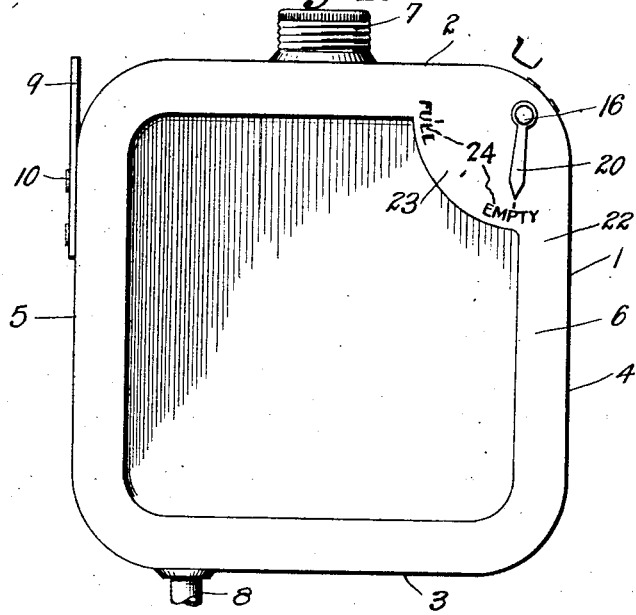
Fig. 1 is an end view of a reservoir showing the position of the indicator member when the reservoir is empty.

Referring in detail to the drawings:

1 designates a substantially cubical reservoir comprising top and bottom walls 2 and 3, front wall 4, back wall 5, and the enclosing end walls of which one end wall 6 is shown. The usual inlet assembly 7 is inserted in the top wall, and an outlet 8 in the bottom wall permits the liquid carried by the reservoir to flow into the dispensing pipe system. The reservoir is attached to a lavatory wall by plate 9 secured to the back wall 5 of the reservoir by bolts 10 and at a suitable altitude to provide a head for the liquid in the reservoir and pipes. Such reservoirs are constructed of metal, and it is desirable that means be provided for disclosure of the amount of liquid therein, that timely replacement may be effected. While the problem of providing such means is comparatively simple, the location of the reservoir and the consideration of the nature of the liquid supplied, which in the present case is liquid soap, all present some difficulties. My invention overcomes the difficulties and provides structure both economical of installation and reliable in performance through the interior pivoting of a float member 11 comprising a rod 12, a free end of which is threaded to receive a float consisting of a cork or like floatable body 13, a washer 14 and nut 15 retaining and positioning the said float 13 on the rod, the opposite end of the rod having a right angularly bent portion 16 constituting a journal for the pivoting of the float member 11 in a bracket bearing 17 having flanges 18 wherewith it is secured to the top wall 2 of the reservoir by rivets 19. The said journal portion of the rod projects through the said end wall 6 of the reservoir adjacent an upper corner thereof. Attached to the protruding end of the journal is an index arrow 20 positioned flush with the face of the end wall and designed to rotate thereagainst under actuation by the float member.

Figure 2:
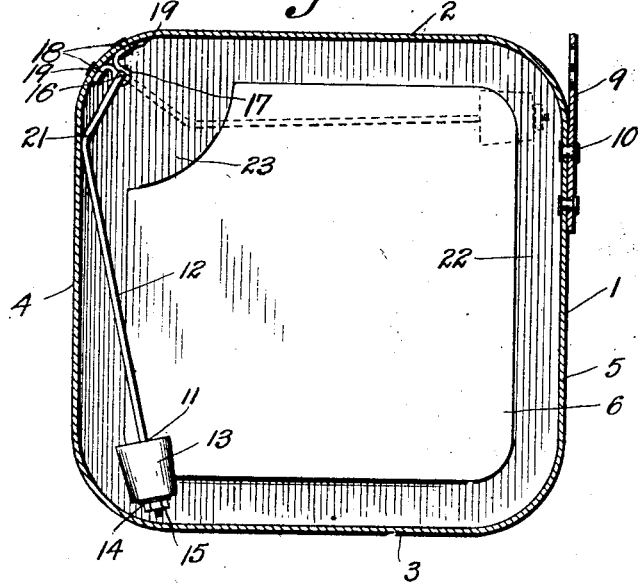
Fig. 2 is a cross section of the empty reservoir on a line near the indicator end thereof and showing the gage in depressed position.

The float member is designed to indicate the level of the liquid by the rotational positioning of the arrow under actuation by the float 13 that rests upon any existing level of the liquid. Two difficulties are here presented, namely, that a float member short enough to clear the back wall upon rotational elevation of the float by the liquid might be locked in vertical position upon retraction, and that a float member long enough to contact the bottom wall upon retraction and be there restrained for response to elevating influence of the rising liquid would not clear the back wall. While it is obvious that a suitably short float member might be provided, elsewhere and otherwise pivoted, such expedient would defeat my other purposes. I therefore provide an elbow 21 for the pivot end of the rod of the float member, by bending said rod in such a way as shown that the elbow contacts the front wall of the reservoir upon depression of the float member, and so limits the downward travel of the float and retains said float in a position from which it is dislodgable by the rising level of the liquid and also enables the provision of a float member of such length that it will clear the back wall upon being elevated to the position shown by the dotted lines in Fig. 2.

My structure makes it possible therefore to install the index arrow at the upper, and outer corner of the end wall, where it is conveniently visible and where its installation is both economical and desirable from the manufacturing standpoint.

The end wall 6 is preferably provided with a peripheral boss 22 constituting a raised border, and this boss is expanded, at the corner where the index arrow is installable, into a segmental dial face 23 on which are inscribed the indicia 24 to which the arrow, in different positions, points instructive of the level of the liquid.

I prefer to construct my device with rounded edges, and to attach the bracket flanges interiorly of a rounded edge whereby the bearing is positioned in a diagonal plane of the case or container, as shown.

What I claim and desire to secure by Letters Patent is:

In a device of the class described, a box, a float gage comprising a bar provided with a float on one end and having its other end bent to constitute a journal, a bracket interiorly mounted on a wall of the box, said journal being pivotally mounted on the bracket, the bent end of said journal protruding through an aperture in a wall of the box, an index arrow secured to said protruding end of the journal, said bar having a bend adjacent the said journal end for engagement with a wall of the box.

In testimony whereof I affix my signature.

NEWTON S. HILLYARD.